May 11, 1948.   L. KRASNOW   2,441,158

MACHINE TOOL

Filed Nov. 3, 1944

INVENTOR.
Leonard Krasnow
BY Charles R. Fay
atty

Patented May 11, 1948

2,441,158

UNITED STATES PATENT OFFICE 2,441,158

MACHINE TOOL

Leonard Krasnow, Worcester, Mass.

Application November 3, 1944, Serial No. 561,703

4 Claims. (Cl. 77—3)

This invention relates particularly to the metal working industry but the invention can be applied equally well to other arts.

Objects of the invention include the provision of a material working cutter which is mounted on a holder for the purpose of cutting material, as for instance in a boring head or other machine tool, there being provided means for warping or distorting the cutter holder to bring the cutter to the work or to retract it therefrom for the purpose of forming irregular surfaces, particularly in interior work, and also for the purpose of retracting the cutter from material being worked upon, so that the cutter and holder may be retracted after the cut is made without scoring the work or causing drag lines.

Further objects of the invention include the provision of a tool holder having a tool thereon, in combination with means for distorting, bending, or flexing the tool holder for the purpose of backing the tool from the work, as for instance in boring operations where work is done internally, so that the tool may be retracted without marking or scoring the work.

Other objects and advantages of the invention will appear hereinafter.

Reference is to be had to the accompanying drawings, in which

Particularly in boring operations it is well known that it is very difficult to retract the boring head cutter without scoring the work, as in a boring head the tool rotates but has no satisfactory provision for lateral adjustment relative to the boring machine. This invention provides a means for accomplishing this result in a relatively simple manner, and also provides for boring irregular surfaces.

Figure 3:
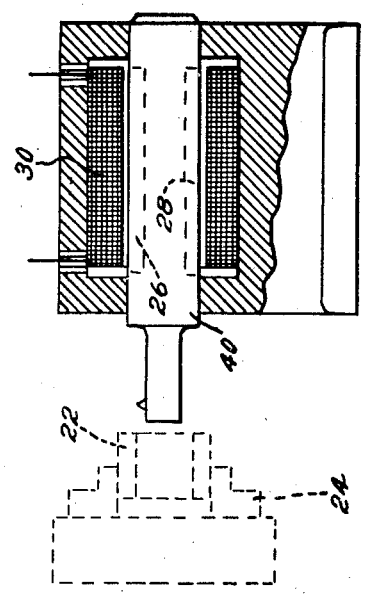
Fig. 3 is a diagrammatic cross section illustrating another operation of the device.
Figure 1:
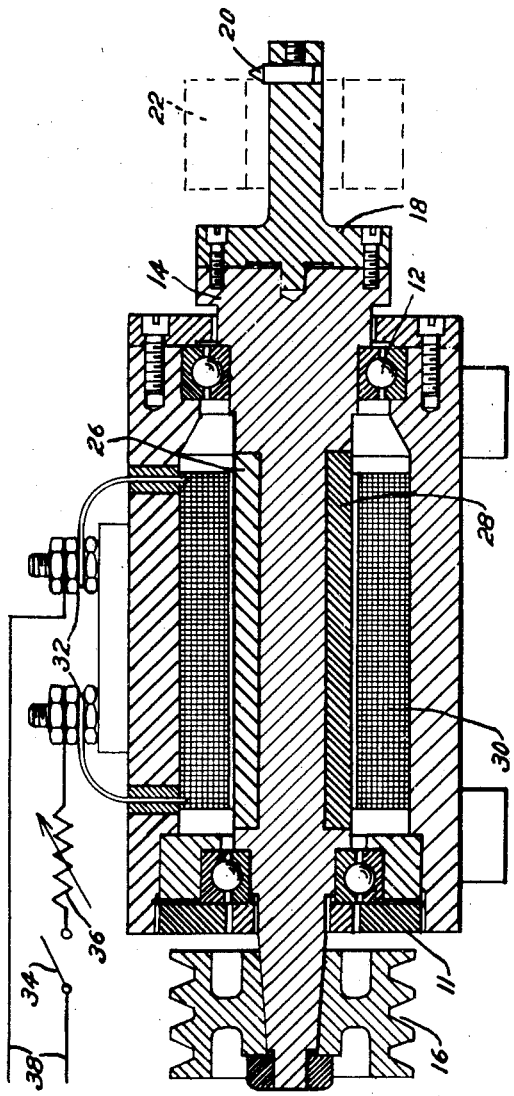
Fig. 1 is a longitudinal sectional view through a device illustrating an embodiment of the invention.

In the drawings, there is shown a housing 10 which may be a boring head and which is provided with bearings 11 and 12 journalling a spindle or stem 14. Spindle 14 may be rotated by any desired means such as by a pulley 16. Spindle 14 is provided with a tool head or quill 18 mounting a tool or cutter 20 thereon in radial position for the purpose of boring through a piece of work 22, the work being held in a chuck 24 as indicated in Fig. 3.

Spindle 14 is provided on diametrically opposite sides with inlaid pieces of a suitable material such as for instance nickel, as shown at 26. The inlaid pieces may be approximately of a thickness one-fourth that of the outside diameter of the spindle 14 and it is preferred that their width should be approximately 30° at the circumference of the spindle 14 and of a length equal to the distance between the ball races, although as illustrated they may be shorter. Diametrically opposed to the nickel inlays 26 there are disposed similar cobalt iron inlays 28 similar in form and shape to the nickel inlay parts.

Surrounding the spindle 14 within the section carrying the nickel and cobalt iron inlays but with sufficient clearance to avoid the same, there is provided an electrical induction winding 30 providing for an induced flux through the spindle when current is passed through the winding 30. The ends of the winding are illustrated as at 32, together with a switch 34 and a variable resistor 36. The line 38 is connected to a source of direct current.

With the switch 34 in open position, the spindle 14 is caused to rotate to provide for the cutting action of the tool 20. The work piece 22 may be fed to the boring head or the latter may be fed to the work. In any case, the work 22 is bored in the usual manner. When the cut has been finished, the switch 34 is closed, applying direct current through the variable resistor to the induction winding 30 and the resulting induced flux will cause the nickel inlays 26 to expand and the cobalt iron inlays 28 to contract due to the magnetostriction phenomenon.

In other words, due to induced magnetism, the different inlays will be acted upon in distinctly different manners so as to distort the spindle enough to retract the tool 20 from the work. In the distorted condition of spindle 14, the work may be retracted from the cutter without leaving a drag line on the finished surface of the work. By means of the variable resistor, the amount of current applied to the inductor winding 30 may be varied, permitting control over the radial position of the point of the tool 20, providing for changing position of the point of tool 20 and allowing the interior surface of the hole being bored to be varied in diameter to provide irregular indentations or grooves in the work piece.

The spindle 14 and inlays may be made of other materials than those specified as long as the distortion or flexing of the tool spindle is achieved.

Figure 2:
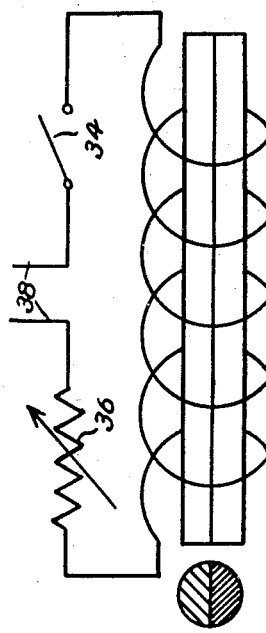
Fig. 2 is a diagrammatic view illustrating the action.

In Fig. 2 the shaft 14 is diagrammatically represented as being a bi-metal part rather than composed of three metals. In this figure the shaft is divided approximately sixty percent cobalt iron or other suitable material and the other party or forty percent of nickel or the like, the two parts being brazed to each other to form a shaft. It is thought that this diagram may more clearly illustrate the device which operates under well-known principles of electro-magnetism.

Fig. 3 illustrates another application of the principle shown and in this case the work piece 22 is itself revolved by being mounted in the chuck 24 attached to the rotating spindle or shaft of a lathe or the like. In this case the tool holder 40 is fixed and does not rotate but is caused to flex by the same means as above described.

It is to be understood that this invention may be carried out by any means which will cause the tool shaft to be deflected or flexed.

Having thus described my invention and the advantages thereof, I do not wish to be limited to the details herein disclosed, otherwise than as set forth in the claims, but what I claim is:

1. In a machine tool of the character described, a tool holder having an elongated stem portion, a cutting tool carried by said holder, a work holder having means for supporting a workpiece in axial alignment with said tool holder, said tool holder and workpiece being axially movable toward and away from each other to bring the tool into operative or inoperative positions with reference to the workpiece, means for producing relative rotation between said tool holder and workpiece holder, and controllable magnetostrictive means to distort said stem and cause the tool to move radially with reference to the workpiece, said magnetostrictive means including metallic strips carried by the stem responding differently to changes in an inductive field, an induction winding surrounding said stem for inducing magnetostriction in said strips, a direct current circuit for supplying current to said coil, and a make and break switch in said circuit whereby when the switch is in one position the stem is distorted to bring the tool out of contact with the workpiece, and when the switch is in the other position the tool is returned to normal working position, thus permitting the tool holder and work holder to be separated axially during rotation of one of them without marring the work.

2. In a machine tool of the character described, a tool holder having an elongated stem portion, a cutting tool carried by said holder, a work holder having means for supporting a workpiece in axial alignment with said tool holder, said tool holder and workpiece being axially movable toward and away from each other to bring the tool into operative or inoperative positions with reference to the workpiece, means for producing relative rotation between said tool holder and workpiece holder, and controllable magnetostrictive means to distort said stem and cause the tool to move radially with reference to the workpiece, said magnetostrictive means including metallic strips carried by the stem responding differently to changes in an inductive field, an induction winding surrounding said stem for inducing magnetostriction in said strips, a direct current circuit for supplying current to said coil, and a make and break switch in said circuit whereby when the switch is in one position the stem is distorted to move the tool in one direction relative to the workpiece, and when the switch is in the other position the tool is moved in the other direction relative to the workpiece thus preventing the tool holder and work holder from being separated axially during rotation of one of them without marring the work, and current varying means in said circuit to control the radial position of the tool with reference to the work.

3. A machine tool as defined in claim 1 wherein the tool holder is rotatable and the work holder is nonrotatable.

4. A machine tool as defined in claim 1 wherein the work holder is rotatable and the tool holder is nonrotatable.

LEONARD KRASNOW.

REFERENCES CITED

The following references are of record in the file of this patent:

UNITED STATES PATENTS

| Number | Name | Date |
|---|---|---|
| 1,768,377 | Serduke | June 24, 1930 |
| 1,882,399 | Pierce | Oct. 11, 1932 |
| 2,224,386 | Guild | Dec. 10, 1940 |